United States Patent

Wang et al.

[11] Patent Number: 5,978,358
[45] Date of Patent: Nov. 2, 1999

[54] METHOD FOR DETERMINING NETWORK SWITCH CAPACITY

[75] Inventors: Jing Wang; Eddy H. Trink; Ping Yang, all of Plano; Seshagiri R. Madhavapeddy, Richardson, all of Tex.

[73] Assignee: Nortel Networks Corporation, Richardson, Tex.

[21] Appl. No.: 08/833,362

[22] Filed: Apr. 4, 1997

Related U.S. Application Data

[60] Provisional application No. 60/027,311, Oct. 1, 1996.

[51] Int. Cl.[6] .......................... G01R 31/08; G06F 11/00; G08C 15/00; H04M 15/00
[52] U.S. Cl. ......................... 370/234; 379/113; 379/137; 370/252
[58] Field of Search .................................. 370/230, 232, 370/233, 234, 235, 237, 250, 252, 253, 377, 378, 379, 410; 455/560, 507, 405, 422; 379/133, 134, 137, 138, 139, 113, 111

[56] References Cited

U.S. PATENT DOCUMENTS

| 4,679,187 | 7/1987 | Irvin ........................................ 379/137 |
| 4,974,256 | 11/1990 | Cyr et al. ................................ 379/113 |
| 5,285,494 | 2/1994 | Sprecher et al. . |
| 5,357,507 | 10/1994 | Hughes et al. .......................... 370/234 |
| 5,359,649 | 10/1994 | Rosu et al. . |
| 5,548,533 | 8/1996 | Gao et al. . |
| 5,559,527 | 9/1996 | Quinn ...................................... 455/422 |

OTHER PUBLICATIONS

XP 000633692, Madhu Vudali, et al., *"BHME: A New Capacity Benchmark in PCS Switching,"* 0–7803–2509–/595 US—1995 IEEE, pp. 2294–2296.

XP 000400591, Magnus Hoglund et al., *"ACCIS—A New Tool for Processor Dimensioning for Call Capacity,"* 8039 Ericsson Review 70(1993) No. 3, Stockholm, SE, pp. 106–113.

*Primary Examiner*—Hassan Kizou
*Assistant Examiner*—John Pezzlo
*Attorney, Agent, or Firm*—Paul Fulbright

[57] ABSTRACT

The switch capacity prediction process of the present invention collects operational measurements from the cellular switch. These operational measurements indicate the frequency of the call events processed by the switch. The other input/output (I/O) time used by the call processor to process messages not related to call processing is separated from the call processing I/O time. A relationship between the other I/O time and the sum of the call processing time and call processing I/O time is determined. A weighted average is determined from the summation of the products of: the frequency of events and the call processing time, the frequency of events and the call processing I/O time, and the other I/O time. The weighted average is then divided into the call processor occupancy time, in hours, to determine the switch capacity.

5 Claims, 2 Drawing Sheets

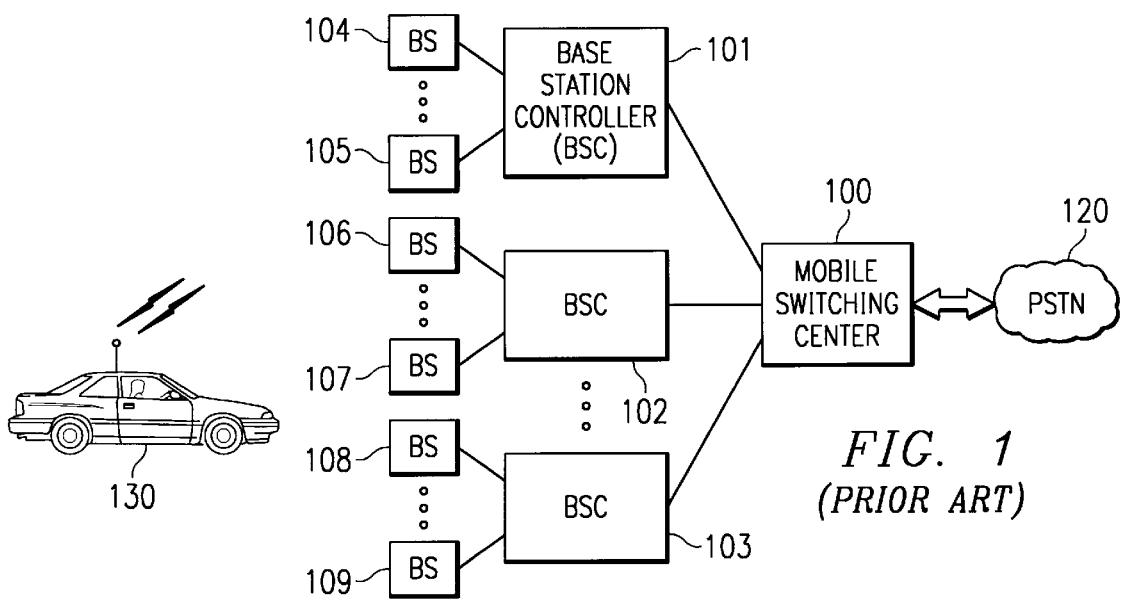
FIG. 1 (PRIOR ART)
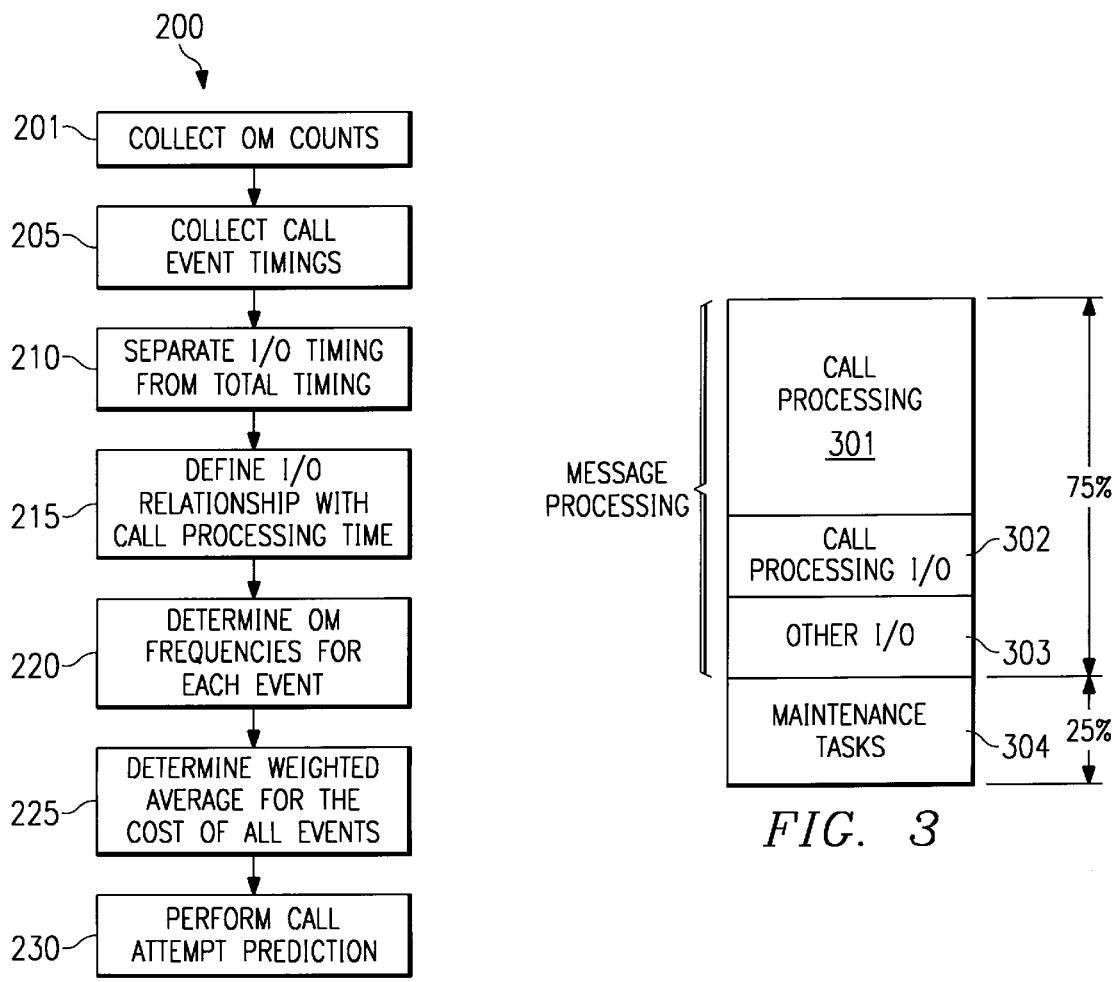
FIG. 2
FIG. 3

METHOD FOR DETERMINING NETWORK SWITCH CAPACITY

This application claims the benefit of U.S. Provisional Application No. 60/027,311 filed Oct. 1, 1996.

BACKGROUND OF THE INVENTION

I. Field of the Invention

The present invention relates generally to radio communications. More particularly, the present invention relates to switch capacity in a cellular radiotelephone system.

II. Description of the Related Art

Cellular radiotelephone networks provide mobile radiotelephone subscribers access to the landline public switched telephone network (PSTN). FIG. 1 illustrates a typical prior art example of such a radiotelephone network.

This network is comprised of a number of base stations (104–109) that use multiple radio transceivers to communicate with the mobile subscriber (130). The base stations are controlled by base station controllers (101–103) that are coupled to a central switch (100), referred to in the art as the mobile switching center (MSC).

The MSC (100) is a point of access to the PSTN (120). The MSC (100) supervises and controls connections between the PSTN (120) and mobile subscribers (130). Any combination of calls are made possible by the MSC (100): land-to-land, mobile-to-land, land-to-mobile, or mobile-to-mobile. The MSC (100) is well known in the art and is therefore not described further.

This network and its elements are generic to multiple types of radiotelephone systems such as the advanced mobile phone system (AMPS), Global System for Mobile communications (GSM) time division multiple access (TDMA), and code division multiple access (CDMA). These standards are described in greater detail in their respective specifications available from the Electronic Industries Association/Telecommunications Industry Association (EIA/TIA).

In addition to functioning as the interface to the public landline network, the above described switch also controls all of the subsystems required for the cellular system. These subsystems include radio channel units, cell site equipment, mobile subscriber billing, and system operational measurement software that are responsible for determining the operational measurements of the switch. Operational measurements are counters that count, for example, the quantity of calls, hand-offs, and dropped calls.

The switches have a limited operational capacity that determines the maximum number of mobile subscribers that a cellular service provider can service. However, since different operations take different amounts of call processor time, switch capacity cannot be determined strictly by the number of subscribers being handled by the switch.

Currently, statistical trending is used to determine switch capacity. Statistical trending assumes that switch capacity and other measures of switch performance can be predicted based on past history. Subscriber behavior, however, changes significantly over time due to many things. An example of a change in subscriber behavior includes a service operator adding free calling after a certain time that will increase the number of calls through a switch. Also, if the local environment changes due to added relocated roads and office buildings, the number of calls through a switch changes.

Statistical trending does not account for the different real time costs of the numerous call processing and mobility events handled by the switch. Statistical trending also does not take into account the impact of new or changed switch software. There is a previously unknown need for a process that determines cellular switch capacity.

SUMMARY OF THE INVENTION

The present invention encompasses a process for determining the call capacity of a network switch. The switch is comprised of a call processor that processes call events. The call events include such operations as land-to-land calls, mobile-to-land calls, land-to-mobile calls, and mobile-to-mobile calls.

The call events are processed by the call processor within a message processing time. The message processing time is made up of call processing time and input/output time. The input/output time is comprised of call processing input/output time and maintenance input/output time.

The process of the present invention begins by collecting operational measurement data, from which the different call events are extracted, from the network switch. The frequencies of the call events are determined by keeping track of the number of times each specific event is processed by the switch.

The other input/output time is separated from the total message processing time. This remaining input/output time is the amount of time the call processor spends performing tasks not related to call processing such as interpreting maintenance messages.

An average work time, the weighted average for the real-time cost of the call events, is determined by summing: the product of the frequency of each call event and the message processing time, the product of the frequency of each call event and the call processing input/output time, and the other input/output time.

The switch capacity level is then computed by dividing the average work time into the message processing time. In the preferred embodiment, the message processing time is converted into hours. The result of this capacity level computation is referred to in the art as the busy hour call attempts prediction.

BRIEF DESCRIPTION OF THE DRAWINGS

FIG. 1 shows a typical prior art radiotelephone system.

FIG. 2 shows a flow chart of the switch capacity prediction process of the present invention.

FIG. 3 shows a call processor time allocation chart in accordance with the present invention.

DETAILED DESCRIPTION OF THE PREFERRED EMBODIMENT

Figure 4:
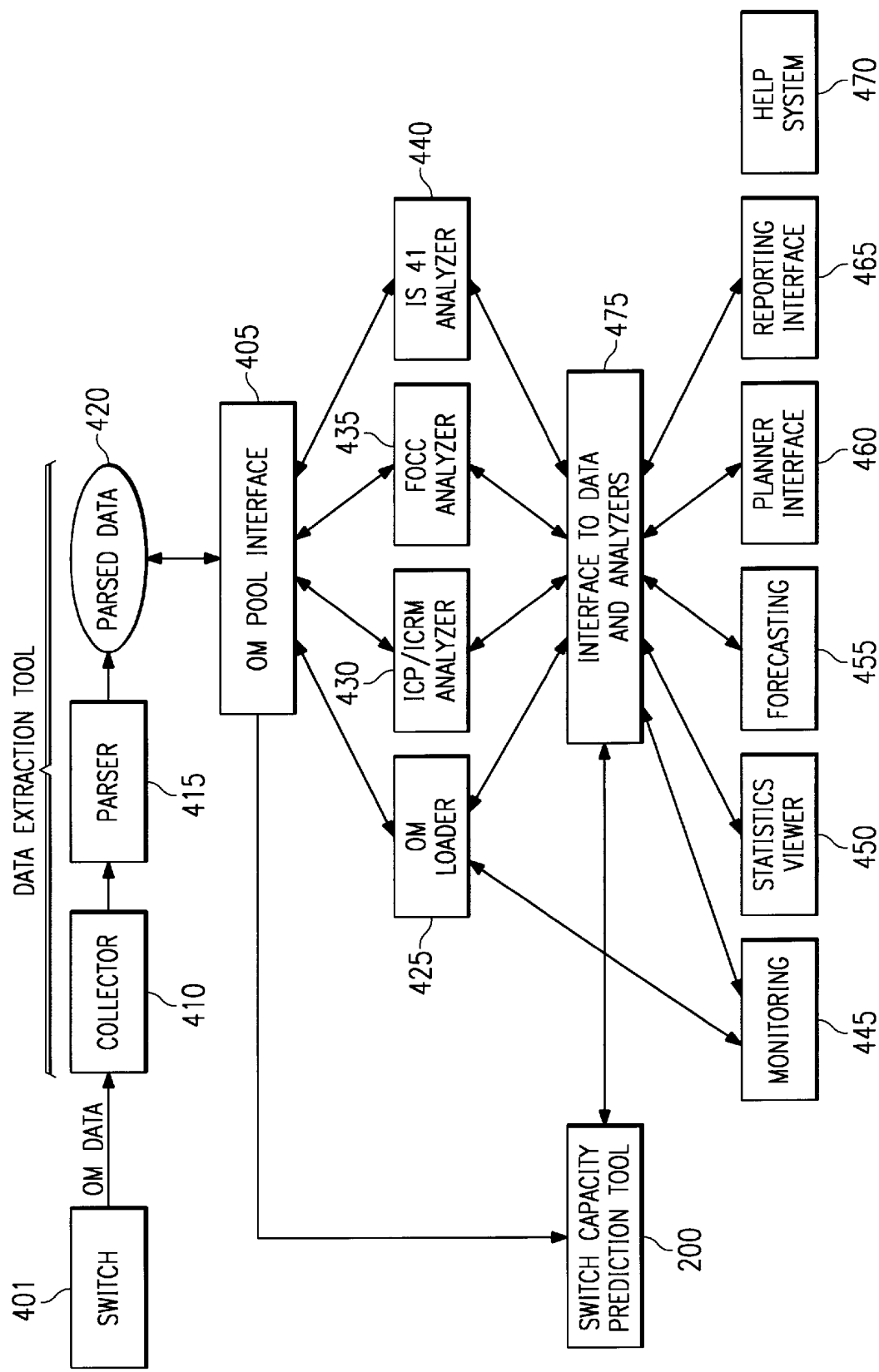
FIG. 4 shows a block diagram of the data extraction system of the present invention.

The system and process of the present invention is a hardware/software tool that collects, stores, and analyzes data from a cellular switch. The data are subsequently referred to as operational measurements (OM). By analyzing the operational measurements, the process of the present invention predicts the capacity of the cellular switch.

The operational measurements, as is well known in the cellular art, are counters for the events that occur in a cellular switch. These events include the activity that takes place within the switch such as a mobile-to-land call, a mobile-to-mobile call, and a land-to-mobile call.

A flowchart of the switch capacity prediction tool (200) of the present invention is illustrated in FIG. 2. The process begins by collecting the operational measurements from the switch (step 201). These counts are used to determine which operational measurement is incremented after a certain call event.

Call event times, also referred to in the art as the real-time costs, are determined (step 205) for each of the different call events. Each call event time is the amount of time required by the call processor to process the event. In the preferred embodiment, these call event times are determined by engineering experimentation. Other embodiments determine the call event times from field processing of each event.

FIG. 3 illustrates a call processor time allocation diagram for the present invention. This diagram shows the I/O timing in relation to the other processes that occupy the call processor. Referring to FIGS. 2 and 3, the process of the present invention separates (step 210) the other input/output (I/O) timing (303) from the total message processing time (301–303).

All of the times (301–304) of FIG. 3 together add up to 100% of the call processor's time. In the preferred embodiment, 75% of that time is typically spent on message processing (301–303). This time includes call processing (301), call processing I/O (302), and the remaining I/O (303) not related to call processing.

The call processing time (301) includes tasks such as setting up voice channels, performing hand-offs, and setting up voice paths. The call processing I/O (302) includes tasks such as getting call processing messages and operational measurement messages.

Included in the message processing time is the other I/O time (303) in which the remaining I/O tasks not related to call processing are interpreted by the call processor. These I/O tasks include getting and interpreting maintenance messages and audit messages. These "other" I/O tasks are included in the message processing time since the call processor does not know the type of message until it is interpreted. For example, if the call processor is interrupted to receive a maintenance message, the processor does not know that it is a maintenance message and not a call hand-off message until the message is interpreted.

Also in the preferred embodiment, 25% of the call processor's time (304) is spent on other tasks such as: operational measurement transfer from the switch, handling billing information for the mobile radiotelephone user, audits (e.g., to determine the busy or idle state of a node), and other maintenance tasks.

The call processor time breakdown illustrated in FIG. 3 is only one embodiment of the process of the present invention. Alternate embodiments use other time allotments between call processing and maintenance tasks. The percentage of time the call processor spends on call processing varies for different service providers and for different hours of the day for any one service provider. For example, if a local radio station is holding a call-in contest, the number of calls handled by the call processor may increase dramatically.

The process of the present invention continues by determining a relationship (step 215) between the other I/O time (303) and the call processing time (301) and call processing I/O time (302). In the preferred embodiment, this time is computed by engineering experimentation and statistical analysis of data from an operating cellular switch. In this embodiment, the other I/O time (303) is approximately one quarter of the sum of the call processing time (301) and the call processing I/O time (302). Alternate embodiments use other relationships between these timings.

The process of the present invention now determines the frequencies of the various events (step 220). This is accomplished by monitoring the switch of which the capacity is being determined. The operational measurements from this switch indicate the number of times each particular event occurs.

Using the frequency of the events, the call processing time, the call processing I/O time, and the other I/O time, a weighted average is determined (step 225) for the cost of all of the events in the system. This weighted average is computed using the following equation:

$$AWT = \Sigma(F_E * CP_E) + (F_E * CPIO_E) + I/O$$

where $F_E$ is the frequency of a particular event, $CP_E$ is the call processing time for that event, $CPIO_E$ is the timing for the call processing I/O, and I/O is the timing for the remaining I/O of the switch that is not related to call processing. As discussed above, this remaining I/O is a constant (0.25) times the number of messages in a set of events. This summation is performed on all of the different events handled by the switch.

The weighted average is used by the process to then determine the call attempt prediction (step 230). This prediction is referred to in the art as the Busy Hour Call Attempts (BHCA). This prediction is computed as follows:

$$BHCA = \frac{CPOCC * (3.60 \times 10^6)}{AWT}$$

where CPOCC is the time that the call processor is occupied with call processing tasks. Since AWT is typically in milliseconds, the $3.60 \times 10^6$ converts the milliseconds to hours. CPOCC is set at 0.75 in the preferred embodiment, assuming the call processor is occupied 75% of the time doing call processing tasks. Alternate embodiments use other constants for CPOCC depending on the amount of time the call processor is performing call processing tasks.

The operational measurements used by the process of the present invention are collected by a separate tool, subsequently referred to as the data extraction tool. This tool collects, stores, and analyzes operational measurements from the cellular switch. A block diagram of this tool, incorporating the capacity prediction tool of the present invention, is illustrated in FIG. 4.

In the preferred embodiment, the data extraction tool is coupled to the switch (401) over an X.25 connection. Alternate embodiments use other types of connections. The X.25 protocol is well known in the art and is therefore not described further.

The collector module (410) of the present invention collects operational measurements from the cellular switch (401). A parser module (415) breaks down the data files collected from the cellular switch (401), extracts required information from them and stores this information in a format suitable for the analyzer's of the data extraction tool. The data from the parser (415) is stored in a centralized database (420). File output from the parser (415) includes several types of records, such as block header records, class records, key records, data records, and group information records. These types of records are well known in the cellular art and are not discussed further.

Automatic data collection from the switch (401) takes place in near real-time fashion. In the preferred embodiment, this time is approximately in a range of 8 to 38 minutes. Alternate embodiments perform data collection at different rates. Data from the switch (401) is transmitted to the data extraction tool using an Automatic File Transfer (AFT) protocol.

The data extraction tool contains the server that implements the Automatic File Transfer Multi-Network Protocol (AFT-MNP). This enables automatic transmission of data at fixed intervals. This server waits for file transfer requests to originate from the cellular switch. When it is time for the switch to transfer a file containing operational measurement data, the AFT process in the switch initiates the file transfer and sends the file in fixed size blocks. The AFT-MNP server running in the data extraction tool node receives the data.

Operational measurement collection is conducted periodically. In the preferred embodiment, the collection is performed every operational measurement transfer interval (every 30 minutes). Alternate embodiments use other collection periods.

The parser output files are stored in an operational measurement pool (405), where the data remains until accessed by the data extraction tool's operational measurement loader module (425). The switch capacity process of the present invention (200) also gets operational measurements from this data pool (405).

Once the operational measurement data is stored and available, the present invention displays it to the user in a variety of graphical formats (bar charts, tables, etc.). For example, if the switch capacity prediction process of the present invention (200) determines that the switch will exceed its capacity soon, an operator of the system is notified by the display of the information required. This allows the system operator to add the required hardware to the system to increase the capacity of the switch.

In an alternate embodiment, the switch capacity prediction process provides automatic feedback to the system of FIG. 4. The system of FIG. 4 then automatically and dynamically increases the capacity of the switch, in a real-time manner, by instructing the switch to change the hand-off threshold data defined in the switch, peripherals, and radios that optimizes hand-off throughout the system. Specifically, data is changed that causes hand-off to occur successfully more often. As a result, the switch does less RSSI requests (hand-off attempts) and frees up the call processor to do other call processing.

Telecommunication analysts access the raw and engineering data from the database using an X-terminal graphical user interface (GUI) (445–470). The various interfaces enable the analyst to: monitor operational data (445), get statistics (450), retrieve forecast data (455) for the switch, perform planning such as "what if" situations (460), generate reports (465), and access the help system (470) to answer system operation questions.

By selecting from various menu options, the analyst can generate reports and graphs from the various analysis programs (430–440) of the present invention that provide: overall system performance information; capacity related information for specific devices such as Intelligent Cellular Peripherals (ICPs)/Integrated Cellular Remote Module (ICRMs) (430), and resources such as IS-41 links (440) and forward control channels (435), and projections as to future performance based on current trends. ICPs, ICRMs, IS-41 links, and forward control channels are well known in the art and are not discussed further.

The analysis programs (430–440) and the graphical interfaces (445–470) are coupled through a central interface (475). In the preferred embodiment, this interface (475) is a central processor having the capability of interpreting the inputs from the GUI displays and sending the command to the proper analyzer.

In summary, the switch capacity prediction process of the present invention generates an accurate capacity prediction for a cellular switch. By separating the I/O not used for call processing and determining its relationship to the remaining message processing time, a more accurate call attempt prediction can be achieved.

We claim:

1. A method for determining a capacity level of a network switch, the switch having a processor to process a plurality of call events, the processor's time comprising message processing time and maintenance time, the message processing time comprising call processing time, call processing input/output time, and non-call processing related input/output time, the method comprising the steps of:

collecting operational measurement data from the network switch;

separating the non-call processing related input/output time from the message processing time;

determining a frequency of the call events;

determining a weighted average for the real-time cost of the plurality of call events in response to the frequency of call events, the call processing time, the call processing input/output time, and the non-call processing related input/output time; and computing the capacity level in response to the weighted average and the message processing time.

2. The method of claim 1 wherein the capacity level is computed by determining a result of the division of the call message process time by the weighted average.

3. The method of claim 2 and further including transforming the call event process time into milliseconds before dividing by the weighted average.

4. A method for predicting busy hour call attempts for a cellular switch, the cellular switch having a processor to process a plurality of call events that is comprised of different sets of call events, the plurality of call events being processed within a message processing time that comprises call processing time and input/output time, the input/output time comprising call processing input/output time and remaining input/output time, the method comprising the steps of:

collecting operational measurement data from the cellular switch;

retrieving the call events from the operational measurement data;

separating the input/output time from the call event process time;

defining an input/output relationship between the call event process time and the remaining input/output time;

determining a call event frequency for each set of call events;

generating a weighted average by summing a product of each call event frequency and the call event's respective message processing time, a product of each call event frequency and the call event's respective call processing input/output time, and the input/output relationship; and determining the busy hour call attempt prediction in response to the weighted average and the call event process time.

5. The method of claim 4 wherein the input/output relationship is a constant times each set of different call events.

* * * * *